United States Patent
Himberger et al.

(10) Patent No.: US 7,523,494 B2
(45) Date of Patent: Apr. 21, 2009

(54) DETERMINING BLOCKING MEASURES FOR PROCESSING COMMUNICATION TRAFFIC ANOMALIES

(75) Inventors: Kevin Himberger, Raleigh, NC (US); Clark D. Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1098 days.

(21) Appl. No.: 10/774,140

(22) Filed: Feb. 5, 2004

(65) Prior Publication Data

US 2005/0177870 A1 Aug. 11, 2005

(51) Int. Cl.
*G06F 7/00* (2006.01)
(52) U.S. Cl. ............................ 726/13; 726/11; 726/12; 726/14; 726/22; 726/23
(58) Field of Classification Search .................... None
See application file for complete search history.

(56) References Cited

U.S. PATENT DOCUMENTS

| | | | | |
|---|---|---|---|---|
| 5,826,014 | A | 10/1998 | Coley et al. | 395/187.01 |
| 5,958,010 | A | 9/1999 | Agarwal et al. | 709/224 |
| 6,044,402 | A | 3/2000 | Jacobson et al. | 709/225 |
| 6,061,798 | A | 5/2000 | Coley et al. | 713/201 |
| 6,304,975 | B1 | 10/2001 | Shipley | 713/201 |
| 6,345,299 | B2 | 2/2002 | Segal | 709/229 |
| 6,484,203 | B1 | 11/2002 | Porras et al. | 709/224 |
| 6,499,107 | B1 | 12/2002 | Gleichauf et al. | 713/201 |
| 6,519,703 | B1 | 2/2003 | Joyce | 713/201 |
| 6,546,493 | B1 | 4/2003 | Magdych et al. | 713/201 |
| 6,550,012 | B1 | 4/2003 | Villa et al. | 713/203 |
| 6,738,814 | B1 * | 5/2004 | Cox et al. | 709/225 |
| 2002/0101819 | A1 * | 8/2002 | Goldstone | 370/229 |
| 2002/0107953 | A1 | 8/2002 | Ontiveros et al. | 709/224 |
| 2002/0178383 | A1 | 11/2002 | Hrabik et al. | 713/201 |
| 2003/0004689 | A1 | 1/2003 | Gupta et al. | 702/188 |
| 2003/0018914 | A1 | 1/2003 | Cheng et al. | 713/203 |
| 2003/0023708 | A1 | 1/2003 | Jung | |
| 2003/0065943 | A1 | 4/2003 | Geis et al. | 713/201 |
| 2003/0097589 | A1 | 5/2003 | Syvanne | 713/201 |
| 2003/0097590 | A1 | 5/2003 | Syvanne | 713/201 |

FOREIGN PATENT DOCUMENTS

JP 2002073433 3/2002

OTHER PUBLICATIONS

Labuschagne et al. "Activating Dynamic Countermeasures to Reduce Risk," *Information System Security—Facing the Information Society of the 21st Century*, 1996.
Labuschagne et al. "The Use of Real-Tim Risk Analysis to Enable Dynamic Activation of Countermeasures," *Computers and Security*, May 1998.

(Continued)

*Primary Examiner*—Jung Kim
(74) *Attorney, Agent, or Firm*—Dillon & Yudell LLP

(57) ABSTRACT

Communication traffic is processed by detecting an anomaly in the communication traffic. A first blocking measure A is applied to the anomalous traffic that stops the anomalous traffic. A second blocking measure is determined such that application of a logical combination of the first blocking measure A and the second blocking measure to the anomalous traffic stops the anomalous traffic.

4 Claims, 5 Drawing Sheets

OTHER PUBLICATIONS

Sekar et al. "On Preventing Intrusions by Process Behavior Monitoring," *Proc. of the Workshop on Intrusion Detection and Network Monitoring*, 1999.

Balasubramaniyan et al. "An Architecture for Intrusion Detection Using Autonomous Agents," *COAST Technical Report*, COAST Laboratory, Purdue University, Jun. 11, 1998.

"Mitigating the SANS/FBI Top Twenty with Check Point Software Technologies," Check Point Software Technologies Ltd., 2003.

Dasgupta, Dipankar, "Immunity-Based Intrusion Detection System: A General Framework," *Proc. 22nd National Information Systems Security Conference*, 1999.

Perrochon et al. "Enlisting Event Patterns for Cyber Battlefield Awareness," *Proc. DARPA Information Survivability Conference and Exposition*, 1999.

Staniford et al. "Practical Automated Detection of Stealthy Portscans," *Journal of Computer Security*, 2002.

Lindquist et al., "eXpert-BSM: A Host-Based Intrusion Detection Solution for Sun solaris," *Proc. of the 17th Annual Computer Security Applications Conference, IEEE Computer Society*, 2001.

Newman et al. "Intrusion Detection Systems Suspicous Finds," *Data Communications*, vol. 27, No. 11, Aug. 1998, pp. 72-82.

Forte, Dario, "Guaranteeing the Safety of a Network Beyond the Firewall," *Network Security*, Sep. 1998, pp. 12-6.

Wood, Charles Cresson, "Logging, Auditing and Filtering for Internet Electronic Commerce," *Computer Fraud and Security*, Aug. 1997, pp. 11-6.

Marcinkevič, M. "Skaitmeninės televizijos tinklu plėtra Lietuvoje," *Elektronika Ir Elektrotechnika* (*Electronics and Electrical Engineering*), N.o. 6 (41), 2002, pp. 72-5.

US 6,542,592, 04/2003, Heilmann et al. (withdrawn)

* cited by examiner

DETERMINING BLOCKING MEASURES FOR PROCESSING COMMUNICATION TRAFFIC ANOMALIES

BACKGROUND OF THE INVENTION

The present invention relates to communication networks, and, more particularly, to processing traffic anomalies in communication networks.

Communication networks are susceptible to malicious attacks designed to degrade and/or disable their functionality. For example, communication networks may be targeted with denial of service attacks, viruses, worms, and/or other types of destructive mechanisms. Unfortunately, such attacks may involve the transmission of communication traffic through a network that is interspersed with larger amounts of valid traffic. When anomalous traffic associated with an attack is detected, blocking all traffic to protect the network from the attack may, unfortunately, block significant amounts of valid traffic.

SUMMARY

According to some embodiments of the present invention, communication traffic is processed by detecting an anomaly in the communication traffic. A first blocking measure A is applied to the anomalous traffic that stops the anomalous traffic. A second blocking measure B is determined such that application of a logical combination of the first blocking measure A and the second blocking measure B to the anomalous traffic stops the anomalous traffic.

In other embodiments of the present invention, the second blocking measure B is determined by applying a logical combination of A and the second blocking measure B given by (A & !B) to the anomalous traffic where the logical combination (A & !B) is a less restrictive blocking measure than the logical combination (A & B). The logical combination (A & !B) is enforced if the logical combination (A & !B) stops the anomalous traffic.

In still other embodiments of the present invention, a third blocking measure C is determined such that application of a logical combination of (A & !B) and the third blocking measure C to the anomalous traffic stops the anomalous traffic if the logical combination (A & !B) stops the anomalous traffic.

In still other embodiments of the present invention, the second blocking measure B is determined by applying a logical combination (A & B) to the anomalous traffic if the logical combination (A & !B) does not stop the anomalous traffic. The logical combination (A & B) is enforced if the logical combination (A & B) stops the anomalous traffic.

In still other embodiments of the present invention, a third blocking measure C is determined such that application of a logical combination of (A & B) and the third blocking measure C to the anomalous traffic stops the anomalous traffic if the logical combination (A & B) stops the anomalous traffic.

In still other embodiments of the present invention, a second blocking measure C is determined such that application of a logical combination of A and the third blocking measure C to the anomalous traffic stops the anomalous traffic if the logical combination (A & B) does not stop the anomalous traffic.

In further embodiments of the present invention, detecting an anomaly in the communication traffic comprises detecting a pattern in a value of at least one protocol field associated with the communication traffic.

In still further embodiments of the present invention, detecting an anomaly in the communication traffic comprises detecting that a flow rate of the anomalous traffic exceeds a threshold.

In other embodiments of the present invention, communication traffic is processed by detecting an anomaly in the communication traffic. A first blocking measure A is applied to the anomalous traffic that reduces a flow rate of the anomalous traffic below a threshold. A second blocking measure B is determined such that application of a logical combination of the first blocking measure A and the second blocking measure B to the anomalous traffic reduces the flow rate of the anomalous traffic below the threshold.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
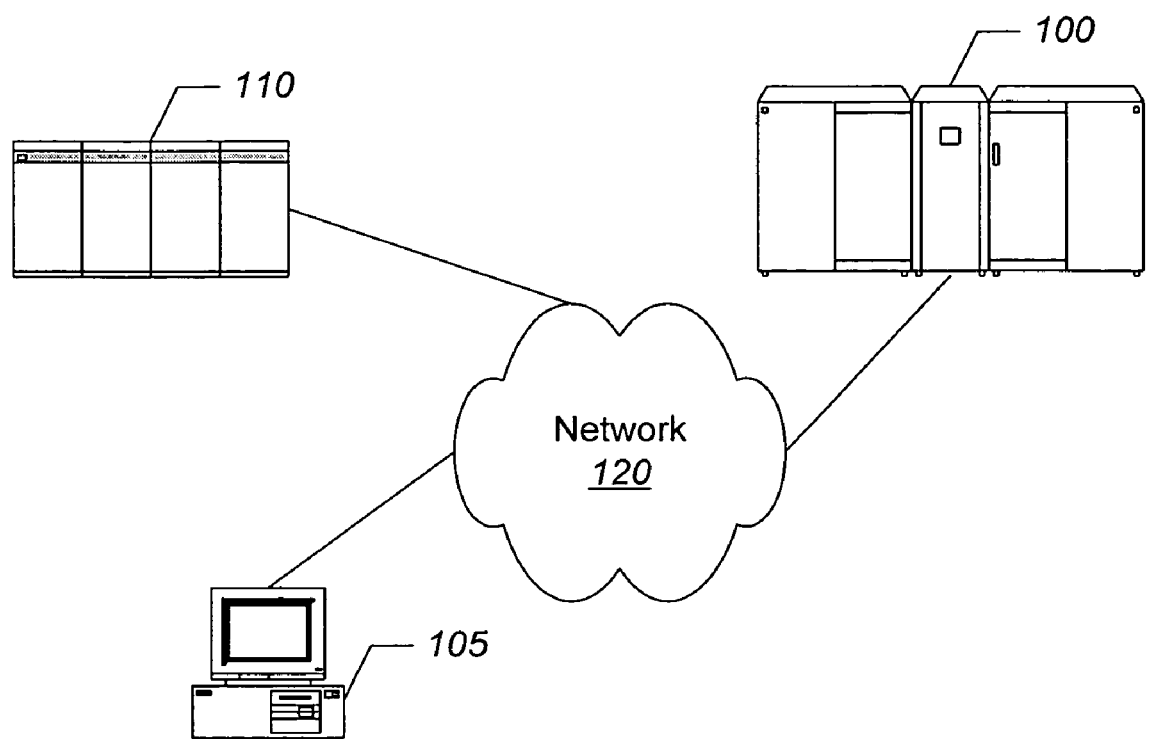
FIG. 1 is a block diagram that illustrates a communication network for determining blocking measures for processing communication traffic anomalies in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 is a block diagram that illustrates a communication network for determining blocking measures for processing communication traffic anomalies in accordance with some embodiments of the present invention. As shown in FIG. 1, the communication network comprises a data processing system 100 that is configured to communicate with a computer or terminal 105 and a server or network node 110 via a network 120. The network 120 may comprise, for example, the Internet, a wide area network, a local area network, and/or combinations of such networks. In accordance with some embodiments of the present invention, the computer or terminal 110 may communicate with the data processing system 100 in accordance with a client-server protocol. It will be understood that the data processing system 100 may communicate with many computers, servers, network nodes, data processing systems, network entities, etc. in accordance with various embodiments of the present invention. Moreover, these other computers, servers, nodes, systems, and/or entities may be the source of malicious communication traffic anomalies, which may be destructive to the data processing system 100 and/or to the networks of which it is a participant.

Although FIG. 1 illustrates an exemplary communication network for determining blocking measures for processing communication traffic anomalies in accordance with some embodiments of the present invention, it will be understood that the present invention is not limited to such a configuration but is intended to encompass any configuration capable of carrying out operations described herein.

Figure 2:
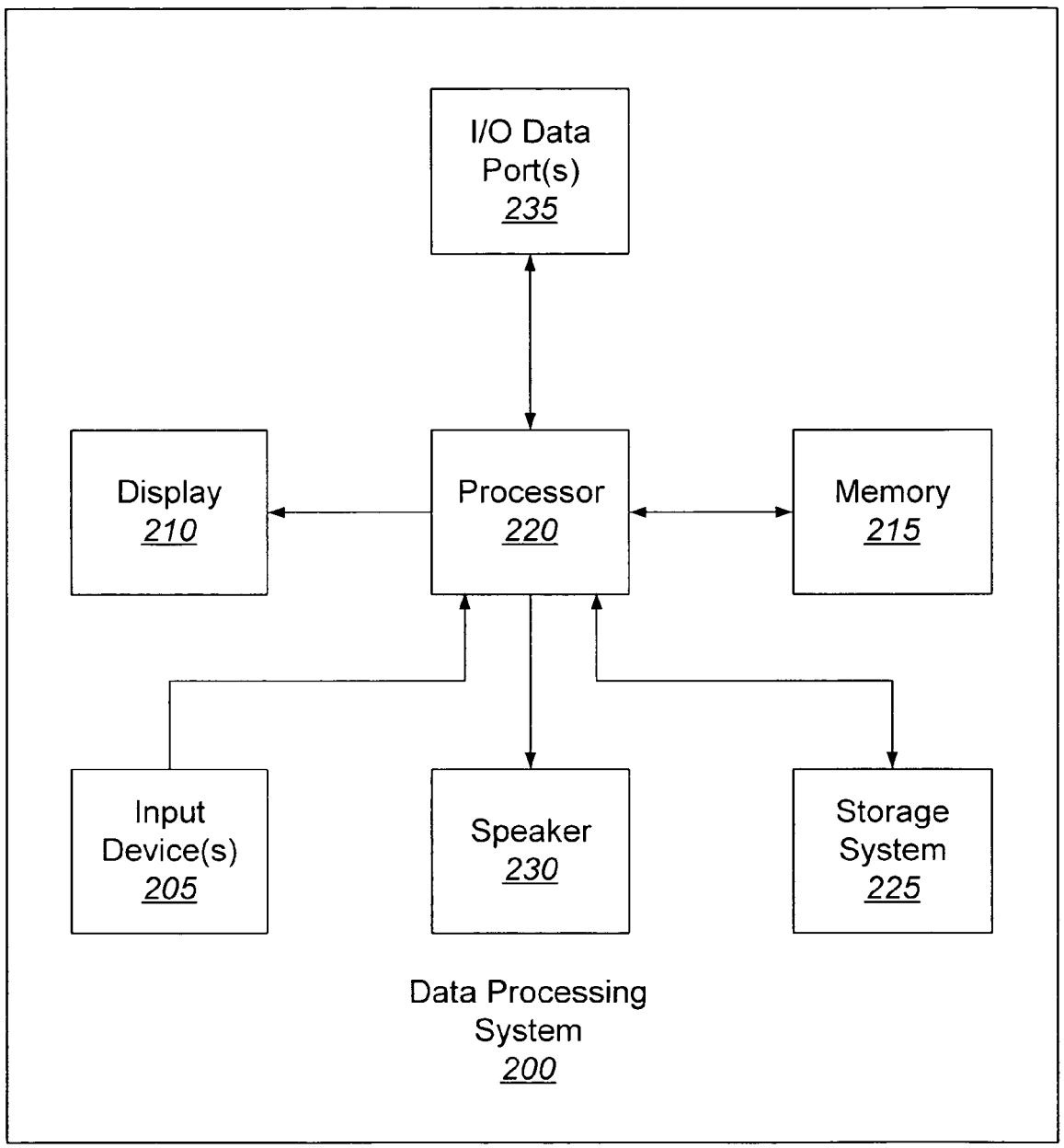
FIG. 2 is a block diagram that illustrates a data processing system in accordance with some embodiments of the present invention.

FIG. 2 illustrates a data processing system 200 that may be used to implement the data processing system 100 of FIG. 1 in accordance with some embodiments of the present invention. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RAMDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art.

Figure 3:
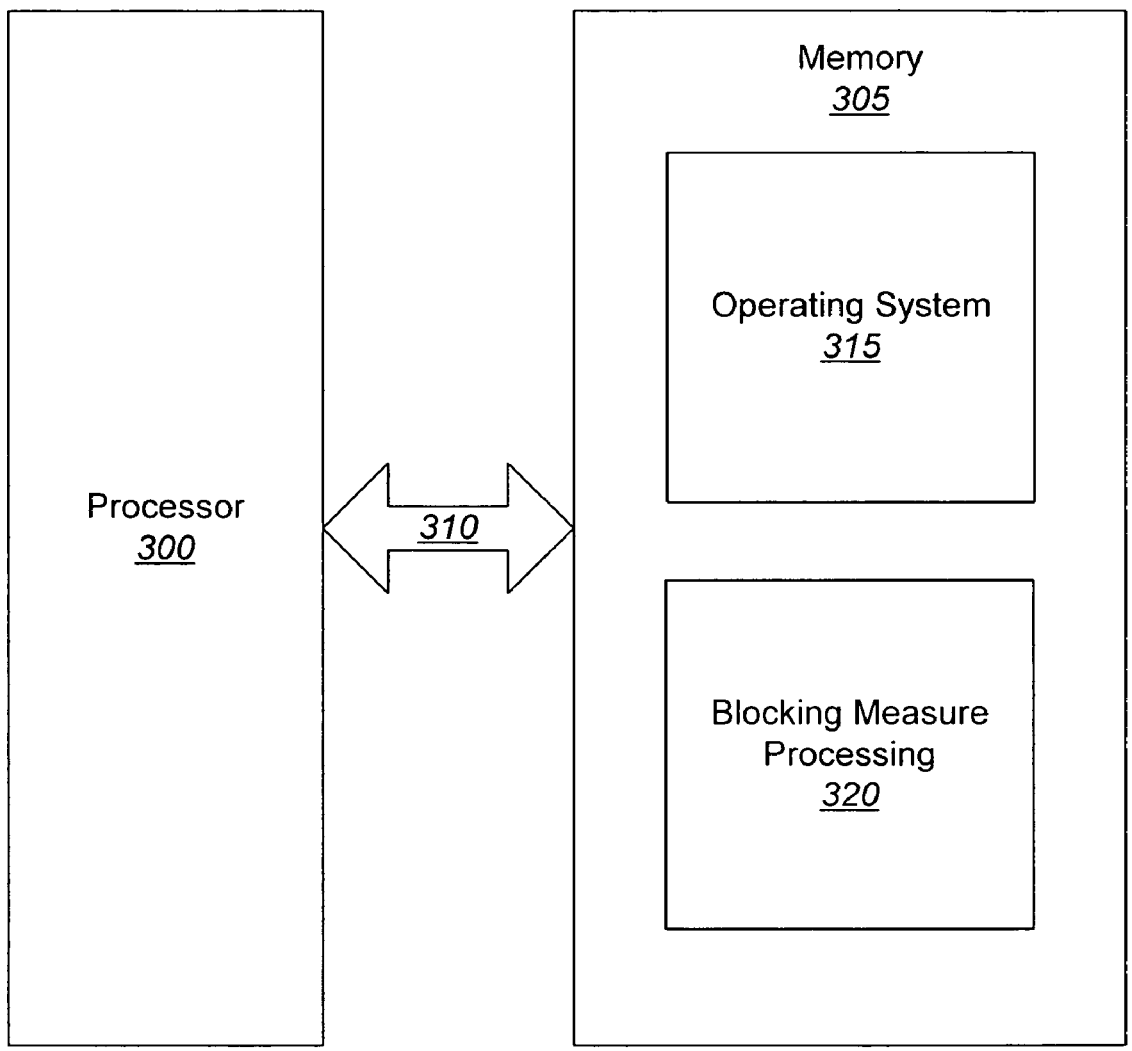
FIG. 3 is a block diagram that illustrates a software/hardware architecture for determining blocking measures for processing communication traffic anomalies in accordance with some embodiments of the present invention.

FIG. 3 illustrates a processor 300 and memory 305 that may be used in embodiments of data processing systems, such as the data processing system 200 of FIG. 2, for determining blocking measures for processing communication traffic anomalies in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used to facilitate determining blocking measures for processing communication traffic anomalies in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a blocking measure processing module 320. The operating system 315 generally controls the operation of the data processing system. In particular, the operating system 315 may manage the data processing system's software and/or hardware resources and may coordinate execution of programs by the processor 300.

The blocking measure processing module 320 may be configured to determine a set of measures that may be applied to a traffic stream to block or reduce the flow of traffic anomalies while still allowing valid traffic to pass through. Operations for determining these measures will be described in detail hereinafter.

Although FIG. 3 illustrates an exemplary hardware/software architecture that may be used in data processing systems, such as the data processing system 200 of FIG. 2 and/or the data processing system 100 of FIG. 1, for determining blocking measures for processing communication traffic anomalies, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 3 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for determining blocking measures for processing communication traffic anomalies, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
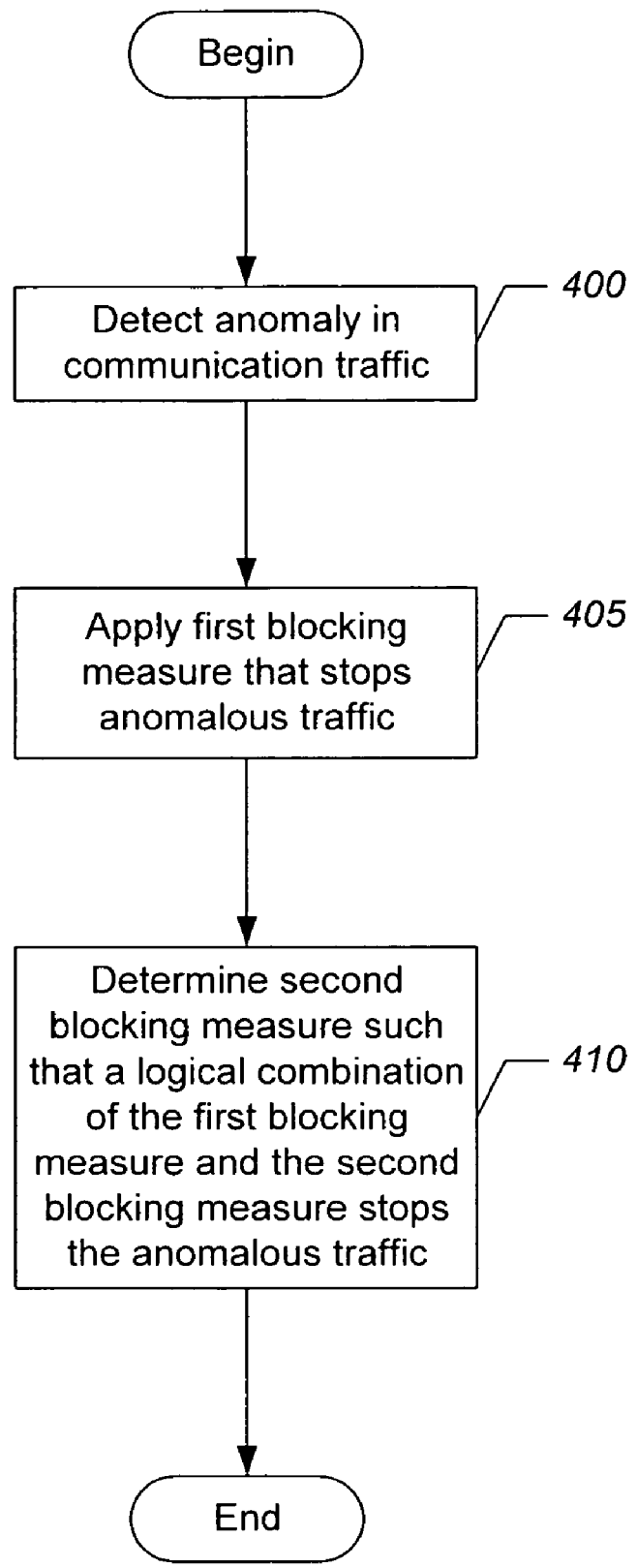
FIGS. 4 and 5 are block diagrams that illustrate operations for determining blocking measures for processing communication traffic anomalies in accordance with some embodiments of the present invention.

Referring now to FIG. 4, exemplary operations for determining blocking measures for processing communication traffic anomalies, in accordance with some embodiments of the present invention, will now be described. Operations begin at block 400 where the blocking measure processing module 320 may detect an anomaly in communication traffic. The anomaly may be detected by detecting a pattern in a value of one or more protocol fields associated with the communication traffic in accordance with some embodiments of the present invention. Examples of such fields may include, but are not limited to, IP and/or TCP fields, such as IP source address, IP destination address, and TCP destination port. Moreover, to avoid triggering blocking measures for very small bursts of anomalous traffic, the blocking measure processing module 320 may not recognize an anomaly in the communication traffic unless the flow rate of the anomalous traffic exceeds a threshold.

At block 405, the blocking measure processing module 320 applies a first blocking measure that stops the anomalous traffic. The blocking measure processing module 320 then determines a second blocking measure such that a logical combination of the first blocking measure and the second blocking measure stops the anomalous traffic at block 410. Advantageously, the logical combination of the first and second blocking measures is less restrictive than the first blocking measure alone thereby allowing more valid traffic to pass through the network.

In accordance with other embodiments of the present invention, the operations of FIG. 4 may involve using blocking measures to reduce the flow of anomalous traffic below a threshold rather than stopping anomalous traffic entirely.

Figure 5:
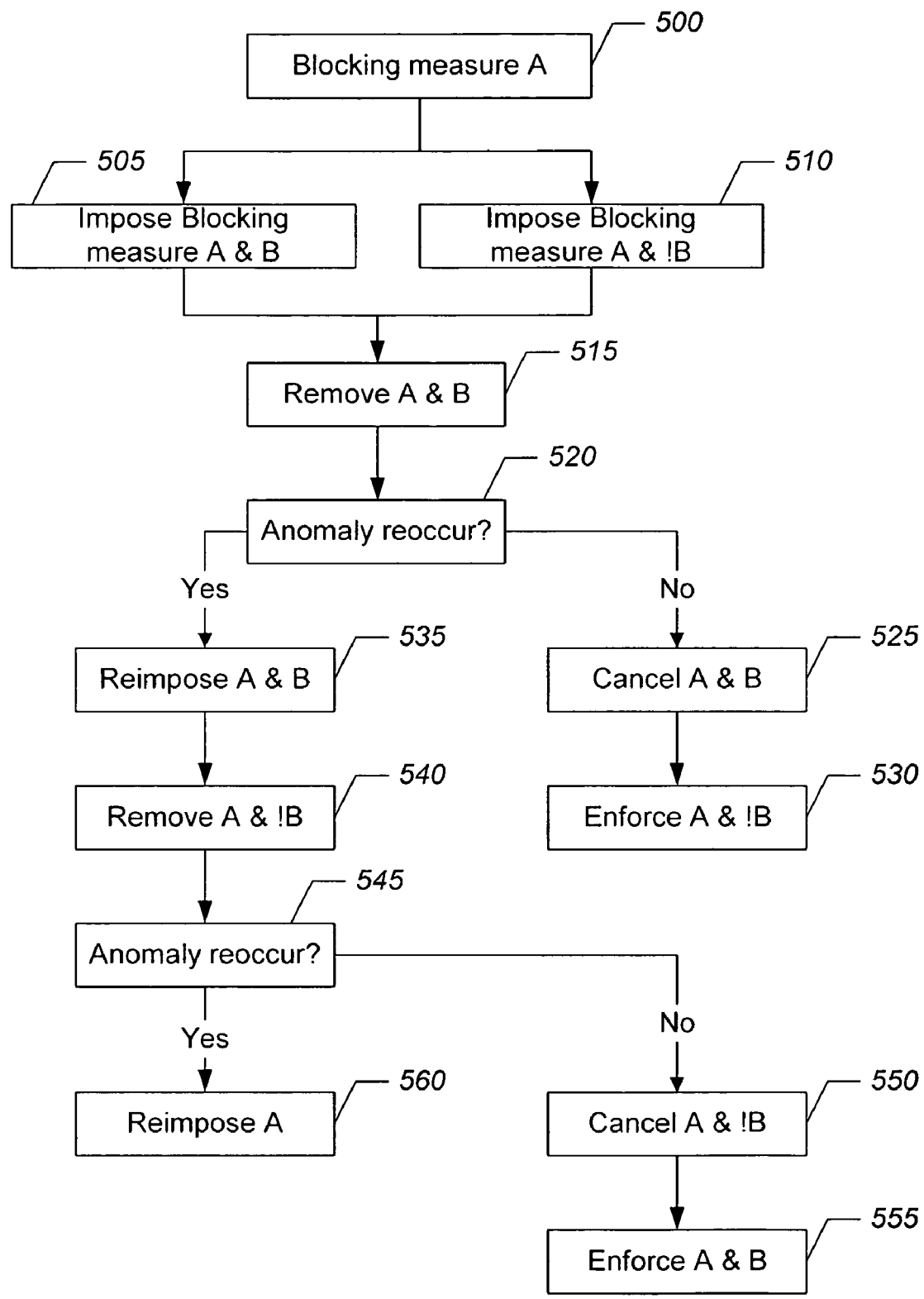

Operations for determining blocking measures for processing communication traffic anomalies, in accordance with some embodiments of the present invention, may be illustrated by way of example with reference to FIG. 5. Operations begin at block 500 where the blocking measure processing module 320 imposes a blocking measure A that stops the anomaly in the communication traffic. At blocks 505 and 510, the blocking measure processing module 320 may impose the logical combinations of blocking measures A & B and blocking measures A & !B. For purposes of illustration, the combination of A & B may be considered to be more restrictive than A & !B. Accordingly, the combination of A & B is removed at block 515 and a determination is made at block 520 whether the anomalous traffic reoccurs.

If the anomalous traffic does not reoccur, then the logical combination of blocking measures A & B may be canceled at block 525 and the combination of A& !B may be enforced at block 530. If, however, the anomaly reoccurs as determined at block 520, then the blocking measure processing module 320 may impose the logical combination of blocking measures A & B at block 535 and remove the logical combination of blocking measures A & !B at block 540.

If the anomalous traffic does not reoccur as determined at block 545, then the blocking measure processing module 320 may cancel the logical combination of blocking measures A & !B at block 550 and may enforce the logical combination of blocking measures A & B at block 555. If, however, the anomalous traffic does reoccur as determined at block 545, then neither the logical combination of blocking measures A & B nor the logical combination of blocking measures A & !B were able to stop the anomalous traffic. Therefore, the blocking measure processing module 320 re-imposes blocking measure A at block 560. Note that the operations of FIG. 5 may then be repeated to include another blocking measure C whether blocking measures A & C are enforced, blocking measures A & !C are enforced, or blocking measure A is enforced to further reduce the restrictive nature of the blocking measures that are ultimately imposed. This process may be repeated as many times as desired to find a combination of blocking measures that blocks the traffic causing the anomaly and yet allows most other traffic to proceed. Moreover, in accordance with some embodiments of the present invention, the operations for selecting a combination of blocking measures may start based on a combination rather than a single blocking measure if the blocking measure processing module 320 has information indicating that a particular combination of blocking measures may be effective for a particular type of traffic anomaly.

In other embodiments of the present invention, further logical combinations of blocking measures may be tried in a systematic, tree-like pattern of tests to determine eventually a relatively restricted and simple set of blocking conditions to impose that still stop the anomaly. For example, potential blocking measures A, B, C, D, and E may be considered and then a systematic and deterministic procedure that passes through a tree-like test structure to determine eventually that the blocking measure exemplified by A & !B & C & D & !E is sufficient to stop the anomaly. IN this way, a relatively small portion of all traffic is blocked and doing so still relieves the network of the anomaly caused by traffic that fits the logical description A & !B & C & D & !E.

Embodiments of the present invention may also be illustrated by way of example. On Jan. 25, 2003, an Internet worm known as Slammer was released and caused considerable disruption. According to some embodiments of the present invention, it may be learned that blocking Transmission Control Protocol (TCP), User Datagram Protocol (UDP), and Internet Control Message Protocol (ICMP) stops the anomaly. Next, TCP traffic may be blocked and the other traffic allowed. In the case of Slammer, the anomaly would reappear. Then, TCP traffic may be allowed and the other traffic types blocked. In the case of Slammer, the anomaly would not reappear. Then, UDP traffic may be blocked and ICMP traffic allowed. In the case of Slammer, the anomaly would not reappear. Then, UDP traffic with destination port values less than 1024 may be blocked and UDP traffic with destination port values greater than or equal to 1024 may be allowed. In the case of Slammer, the anomaly would reappear. Then, UDP traffic with destination port values less than 1024 may be allowed and UDP traffic with destination port values greater than or equal to 1024 may be blocked. In the case of Slammer, the anomaly would not reappear. A further binary search of all possible destination port values from 1024 through 65535 would eventually yield the fact that blocking UDP traffic with a destination port equal to 1434 would stop the anomaly associated with Slammer.

In other embodiments, the branches of the search tree need not be binary and may branch to multiple cases, i.e., multi-branching. That is, more than two logically unequal blocking measures could be examined in such tests provided that the union of all cases within the combinations is equal to the case that led to the particular branch point of the tree. The time periods of the tests may need to be chosen with care so that sufficient cases, possibly all cases, would eventually be tested until a minimal blocking measure was found. For example, the classes of traffic TCP, UDP, and ICMP could be tested in such a way. They may be initially applied for 2, 3, and 4 time steps, where a time step is a convenient value, such as 30 seconds. At the end of 2 seconds, the TCP block would be removed. In the case of Slammer, the anomaly would not reappear. The TCP block would be left off. Then, at the end of 3 time steps, the UDP block would be removed. In the case of Slammer, the anomaly would reappear so the UDP block would be reapplied, this time for a longer period, such as 5 additional time steps. Then, at the end of 4 time steps, the ICMP block would be removed. In the case of Slammer, the anomaly would not reappear so the ICMP block would be left off. This would have the effect of focusing attention on UDP. Destination port values may then be tested.

The following algorithm may be used to determine a combination of blocking measures B0 and B1, which may be assumed that at least one of which is effective at blocking an anomaly in a communication traffic stream. If an anomaly packet occurs in a time interval [t−Δt, t), then $A(t)$=true, else $A(t)$=false. If the blocking measure B0 is enforced during time interval [t−Δt, t), the $B0(t)$=true, else $B0(t)$=false. Similarly for $B1(t)$. A timestamp $TS(t)$ is equal to the current time or its previous value. A count $C0(t)$ is used to update $B0(t)$ and has an upper limit of L0. Likewise, $C1(t)$ is used to update $B1(t)$ and has an upper limit of L1. The period that B0 and/or B1 is applied can increase if the anomalous traffic persists. Parameters used as base period BP0 and multiplier Mult0 for B0 and BP1 and Mult1 for B1. N0 is true if blocking measure B0 is necessary, otherwise N0=false. N1 is true if blocking measure B1 is necessary, otherwise N1 is false.

If both blocking measures are necessary to stop penetration of the anomalous traffic, then there may be a number X of time steps and a threshold Th such that if the X+1 most recent penetration measurements (each 0 or 1) add to more than Th, then both B0 and B1 are enforced. If an attack of anomalous traffic occurs in one time interval [t−Δt, t) and is not blocked, then in the next time interval [t, t+Δt) the value of penetration $P(t)$ is true. $B0(t+\Delta t)$ and $B1(t+\Delta t)$ may be expressed as follows in accordance with particular embodiments of the present invention:

$$B0(t+\Delta t)=P(t+\Delta t)\&!B0(t)\&!(B1(t-\Delta t)\&B1(t-2\Delta t))|(!P(t+\Delta t)|B0(t))\&IF(t+\Delta t-TS(t))<(\text{Mult0}^{\wedge}(Cnt0(t)-1)*BP0, \text{ then } 1, \text{ else } 0)|IF(\text{sum}(P(t-X*Dt), P(t))>Th, \text{ then } 1, \text{ else } 0);$$

$$B1(t+\Delta t)=P(t+\Delta t)\&!B1(t)\&!(B0(t-\Delta t)\&B0(t-2\Delta t))|(!P(t+\Delta t)|B1(t))\&IF(t+\Delta t-TS(t))<(\text{Mult1}^{\wedge}(Cnt1(t)-1)*BP1, \text{ then } 1, \text{ else } 0)|IF(\text{sum}(P(t-X*Dt), P(t))>Th, \text{ then } 1, \text{ else } 0); \text{ where}$$

$$P(t+\Delta t)=A(t)\&((N0\&!B0(t))|(N1\&!B1(t)));$$

$$TS(t+\Delta t)=TS(t)+IF(P(t+\Delta t)\&!P(t), \text{ then } t+\Delta t-TS(t), \text{ else } 0);$$

$$C0(t+\Delta t)=\min\{L0,P(t+\Delta t)\&!B0(t)*(C0(t)+1)+!P(t+\Delta t)\&B0(t)*C0(t)\}; \text{ and}$$

$$C1(t+\Delta t)=\min\{L1,P(t+\Delta t)\&!B1(t)*(C1(t)+1)+!P(t+\Delta t)\&B1(t)*C1(t)\}.$$

The flowcharts of FIGS. 4 and 5 illustrate the architecture, functionality, and operations of some embodiments of methods, systems, and computer program products for determining blocking measures for processing communication traffic anomalies. In this regard, each block represents a module, segment, or portion of code, which comprises one or more executable instructions for implementing the specified logical function(s). It should also be noted that in other implementations, the function(s) noted in the blocks may occur out of the order noted in FIGS. 4 and/or 5. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method for processing communication traffic, said method comprising:
   detecting an anomaly in communication traffic within a communication network;
   in response to a detection of an anomaly occurred in said communication traffic, applying a blocking measure A, a blocking measure A & B, and a blocking measure A & !B to said communication traffic for stopping said anomaly;
   determining whether or not said anomaly reoccurs after said blocking measure A & B has been temporarily removed;
   in response to a determination that said anomaly does not reoccur, canceling said block measure A & B from being applied to said communication traffic and enforcing said blocking measure A & !B on said communication traffic;
   in response to a determination that said anomaly reoccurs, reimposing said blocking measure A & B on said communication traffic and temporarily removing said blocking measure A & !B from said communication traffic;
   determining whether or not said anomaly reoccurs after said blocking measure A & !B had been temporarily removed;
   in response to a determination that said anomaly does not reoccur, canceling said block measure A & !B from being applied to said communication traffic and enforcing said blocking measure A & B on said communication traffic; and
   in response to a determination that said anomaly reoccurs, reimposing said block measure A on said communication traffic.

2. The method of claim 1, wherein said blocking measure A & !B is a less restrictive blocking measure than said blocking measure A & B.

3. The method of claim 1, wherein said detecting further includes detecting a pattern in a value of at least one protocol field associated with said communication traffic.

4. The method of claim 1, wherein said detecting further includes detecting whether or not a flow rate of said anomalous traffic has exceeded a predetermined threshold.

* * * * *